(12) United States Patent
van 't Hoff

(10) Patent No.: US 7,093,605 B2
(45) Date of Patent: *Aug. 22, 2006

(54) PRESSURE CONTROL DEVICE FOR A PIPELINE

(75) Inventor: Jaap Herman van 't Hoff, Oud-Beijerland (NL)

(73) Assignee: Packaging Technology Holding S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 10/058,763

(22) Filed: Jan. 30, 2002

(65) Prior Publication Data

US 2002/0179151 A1 Dec. 5, 2002

Related U.S. Application Data

(63) Continuation-in-part of application No. PCT/NL00/00547, filed on Jul. 31, 2000.

(30) Foreign Application Priority Data

Jul. 30, 1999 (NL) .................................... 1012754

(51) Int. Cl.
*G05D 16/02* (2006.01)

(52) U.S. Cl. .................... 137/14; 137/505.41; 137/906
(58) Field of Classification Search ............... 137/505, 137/505.41, 505.43, 906, 12, 14
See application file for complete search history.

(56) References Cited

U.S. PATENT DOCUMENTS

| 35,402 | A | * | 5/1862 | Thompson | 137/505.41 |
|---|---|---|---|---|---|
| 2,163,597 | A | * | 6/1939 | Grove | 137/489.5 |
| 2,195,242 | A | * | 3/1940 | Dow | 137/505.37 |
| 2,261,364 | A | * | 11/1941 | Grove | 137/341 |
| 2,618,908 | A | * | 11/1952 | Salter et al. | 137/454.5 |
| 3,120,377 | A | * | 2/1964 | Lipschultz et al. | 366/142 |
| 3,556,128 | A |   | 1/1971 | Scaglione |   |
| 3,913,613 | A | * | 10/1975 | Kostjunin et al. | 137/494 |
| 4,561,465 | A | * | 12/1985 | Rogers | 137/614.05 |
| 5,033,505 | A | * | 7/1991 | Eidsmore | 137/505.39 |
| 5,303,734 | A | * | 4/1994 | Eidsmore | 137/505.43 |
| 6,026,850 | A | * | 2/2000 | Newton et al. | 137/505.41 |

FOREIGN PATENT DOCUMENTS

EP 0960827 A 12/1999

* cited by examiner

*Primary Examiner*—Stephen M. Hepperle
(74) *Attorney, Agent, or Firm*—Fish & Richardson P.C.

(57) ABSTRACT

A pipeline assembly for transporting a fluid such as oil, gas and water along a fluid path extending in the pipeline has a pressure control device incorporated therein. The pressure control device regulates the pressure of the fluid downstream the pressure control device to a predetermined pressure which is independent of, and less than, the pressure prevailing in the pipeline upstream of the pressure control device.

34 Claims, 2 Drawing Sheets

PRESSURE CONTROL DEVICE FOR A PIPELINE

RELATED APPLICATIONS

This is a Continuation-in-part of International Application No. PCT/NL00/00547, filed Jul. 31, 2000, which published in English as WO 01/09696.

FIELD OF THE INVENTION

The invention relates to an assembly for a pipeline for transporting a fluid such as oil, gas and water along a fluid flow path extending in the pipeline, having an pressure control device therein to control fluid flow.

BACKGROUND OF THE INVENTION

The prior art includes a pressure control device arranged to be mounted to a pipeline which pipe line is arranged for transporting a fluid along a fluid flow path extending in the pipeline, wherein the pressure control device is arranged for regulating the pressure of the fluid downstream the pressure control device to a predetermined pressure which is independent of and less than the pressure prevailing in the pipeline upstream of the pressure control device. The prior art also includes an assembly including a pipeline for transporting a fluid such as oil, gas and water along a fluid flow path, in combination with a pressure control device therein for regulating the pressure of the fluid downstream of the pressure control device to a predetermined pressure which is independent of, and less than, the pressure prevailing in the pipeline upstream of the pressure control device. The prior art also includes methods for regulating a pressure of a fluid which is transported along a fluid flow path extending through the pipeline, the method comprising the step of incorporating a pressure control device in the pipeline for regulating the pressure of the fluid downstream the pressure control device to a predetermined pressure which is independent of, and less than, the pressure prevailing in the pipeline upstream of the pressure control device.

Such prior art assemblies, methods and pressure control devices are well known. In the pipeline several kinds of fluids may be transported such as oil, gas, water and other kinds of fluids. A draw back of the known assembly and methods is that they are relatively expensive due to the relatively high costs for the pressure control device. Also the pressure control devices which are used in combination with pipelines for the transport of amongst others oil, gas and water are not very accurate and reliable. Especially for the transport of oil, gas and water the trouble free life time of the pressure control device should be relatively long.

SUMMARY OF THE INVENTION

The invention provides a solution for these drawbacks. The assembly according to the invention is characterized in that, the pressure control comprises a housing provided with an inflow opening and an outflow opening wherein the fluid flow path of the pipeline extends in the housing between the inflow opening and the outflow opening, the inflow opening being in fluid connection with the pipeline upstream of the pressure control device, the pressure control device further comprising a controllable seal for releasing and closing the fluid flow path in the housing and a pressure sensor element accommodated in the housing for movement between a first and a second position, the pressure sensor element in the first position controlling the controllable seal to release the fluid flow path in the housing and in the second position controlling the controllable seal to close off the fluid flow path in the housing, the pressure sensor element on the one hand being exposed to the pressure prevailing in the fluid flow path downstream of the controllable seal, and on the other being exposed to a predetermined force which, in use, determines the predetermined pressure, wherein, in use, the pressure sensor element moves in the direction of the first position when the pressure prevailing in the fluid flow path downstream of the seal drops below the predetermined pressure determined by the predetermined force and the pressure sensor element moves in the direction of the second position when the pressure prevailing in the fluid flow path downstream of the seal rises above the predetermined pressure determined by the predetermined force wherein the pressure control device comprises a gas-tight chamber, the pressure sensor element comprising a plunger accommodated in the chamber for movement in an axial direction of the chamber between the first and the second position, the space enclosed by the plunger and the chamber being filled with a gas for generating said predetermined force and the plunger being movable between the first and the second position in a direction parallel to the direction of the fluid flow path at the controllable seal.

Such an assembly may be manufactured with relatively low costs because it incorporates relatively cheap elements.

Since the setting of the position of the plunger is only a result of the pressure prevailing in the fluid flow path and the pressure in the chamber, a highly accurate control is effected. Moreover, the position of the plunger between the first and the second extreme position does not affect the sum of the forces to which the plunger is subjected. This means that the pressure control is realized in a very accurate manner.

The assembly has the advantage that the pressure of the fluid may be relatively high upstream of the pressure control device. The pressure may also vary upstream of the pressure control device. This may also include pulsating pressure variations. Under such condition the pressure downstream the pressure control device will be a relatively low and constant pressure. Such a constant relatively low pressure downstream the pressure control device is very suitable for the supply of the fluid such as water, gas or oil to end users. Because the pressure upstream the pressure control device may be relatively high and may vary the flow rate to the end users can vary over a wide range. Because the plunger is movable between the first and the second position in a direction of the fluid flow path at the controllable seal forces of the flow of fluid acting on the plunger will not cause friction between the plunger and the housing during movement of the plunger. It also follows that according to a practical embodiment of the assembly the plunger is generally movable between the first and the second position in a direction parallel to a direction from the inflow opening to the outflow opening. Preferably the controllable seal is movable in a direction parallel to the fluid flow path at the controllable seal. This has also the advantage that forces acting from the flow of fluid at the seal and/or plunger will not cause friction between the plunger and/or controllable seal on the one hand and the housing on the other hand during movement of the plunger and/or controllable seal between the first position and the second position.

In particular, it applies that the gas-tight chamber is manufactured from a metal. This minimizes the chances of gas leaking away from the chamber, so that the accuracy of the pressure control device is guaranteed for a long period.

According to a preferred embodiment, it holds that the pressure control device comprises at least one sealing element, such as a rubber ring and the controllable seal comprises a bar-shaped element connected to the plunger outside the space enclosed by the chamber and the plunger, while in the first position, the bar-shaped element and the sealing element release the fluid flow path and in the second position, the bar-shaped element and the sealing element close the fluid flow path. The bar-shaped element is movable between the first and second position in a direction which is parallel to the direction of the fluid flow path along the bar-shaped element. Thus friction is avoided as discussed above. Another advantage is that the assembling of the pressure control device can be carried out with a cylinder which forms the walls of the chamber and which is fixed or not fixed. Known systems are bound by fixed values In most applications the gas pressure in the space is greater than an atmospheric pressure. Preferably the pressure control device is provided with mounting means for mounting the pressure control device to the pipeline. The outflow opening may be in fluid connection with the pipeline downstream of the pressure control device so that the pipeline also extends downstream the pressure control device. It is also possible that the pressure control device forms the end of the pipe line.

The method according to the invention is characterized in that, the used pressure control device comprises a housing provided with an inflow opening and an outflow opening wherein, in use, the fluid flow path of the pipeline extends in the housing between the inflow opening and the outflow opening wherein, in use, the inflow opening being in fluid connection with the pipeline upstream of the pressure control device, the pressure control device further comprising a controllable seal for releasing and closing the fluid flow path in the housing and a pressure sensor element accommodated in the housing for movement between a first and a second position, the pressure sensor element in the first position controlling the controllable seal to release the fluid flow path in the housing and in the second position controlling the controllable seal to close off the fluid flow path in the housing, the pressure sensor element on the one hand being exposed to the pressure prevailing in the fluid flow path downstream of the controllable seal, and on the other being exposed to a predetermined force which, in use, determines the predetermined pressure, wherein, in use, the pressure sensor element moves in the direction of the first position when the pressure prevailing in the fluid flow path downstream of the seal drops below the predetermined pressure determined by the predetermined force and the pressure sensor element moves in the direction of the second position when the pressure prevailing in the fluid flow path downstream of the seal rises above the predetermined pressure determined by the predetermined force wherein the pressure control device comprises a gas-tight chamber, the pressure sensor element comprising a plunger accommodated in the chamber for movement in an axial direction of the chamber between the first and the second position, the space enclosed by the plunger and the chamber being filled with a gas for generating said predetermined force and the plunger being movable between the first and the second position in a direction which parallel to the direction of the fluid flow path at the controllable seal. The pressure control device according to the present invention is characterized as discussed above.

BRIEF DESCRIPTION OF THE DRAWINGS

Hereinafter, the invention will be further specified with reference to the accompanied drawings. In these drawings.

DETAILED DESCRIPTION OF THE PREFERRED EMBODIMENT

Figure 1:
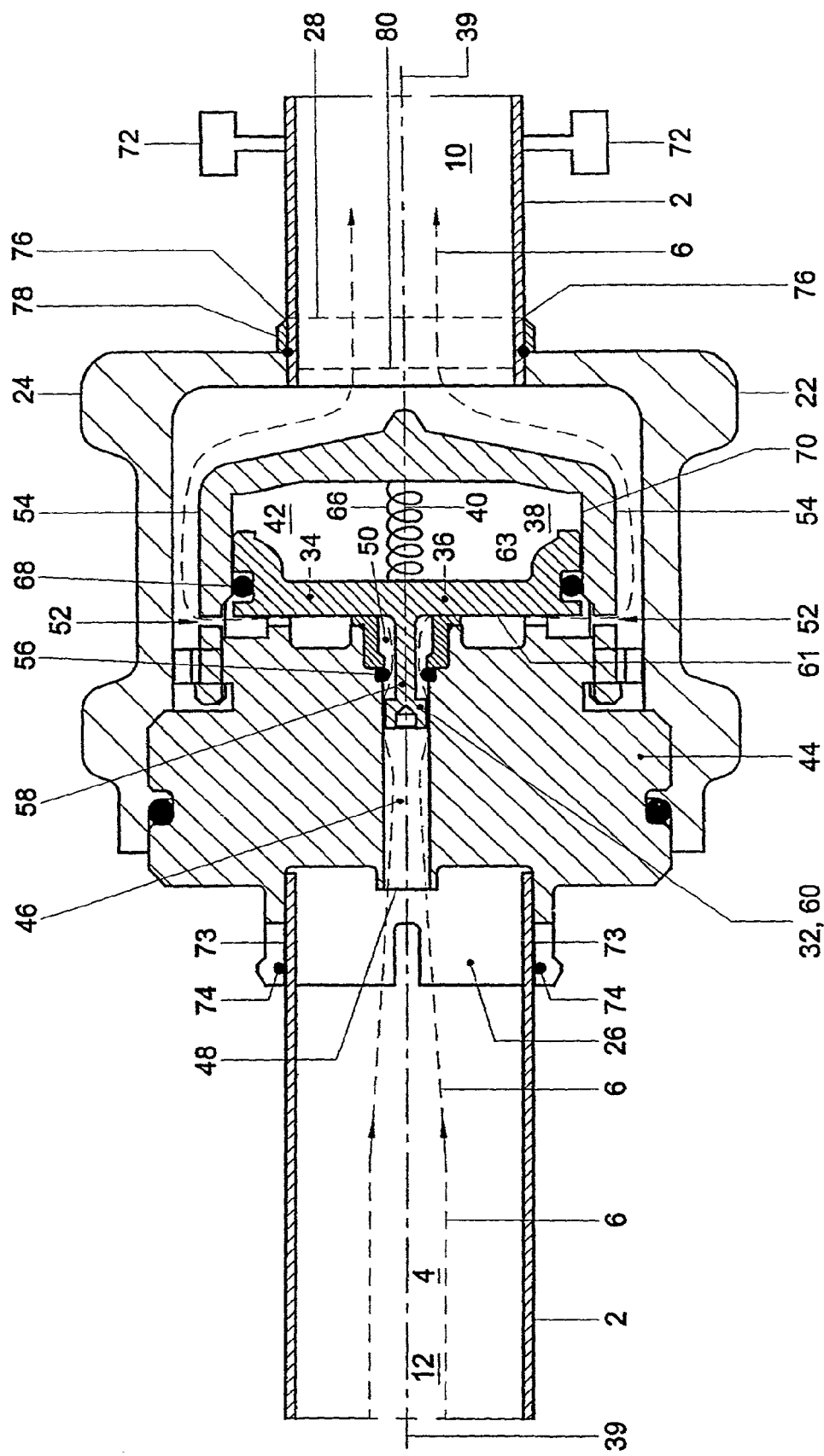
FIG. 1 is a preferred embodiment of an assembly according to the invention.

In FIG. 1, reference numeral 1 designates an assembly according to the invention. The assembly 1 comprising a pipeline 2 for transporting a fluid 4 such as oil, gas and water along a fluid flow path 6 extending in the pipeline 2. In this example, the fluid flow path 6 is indicated schematically by dotted lines. The assembly further comprises a pressure control device 22 incorporated in the pipeline 2 for regulating the pressure of the fluid downstream the pressure control device to a predetermined pressure which is independent of and less than the pressure prevailing in the pipeline 2 upstream 12 of the pressure control device 22. The pressure control device 22 comprises a housing 24 which is provided with an inflow opening 26 and an outflow opening 28. The fluid flow path 4 of the pipeline 2 extends in the housing 24 between the inflow opening 26 and the outflow opening 28. The inflow opening 26 is in fluid connection with the pipeline 2 upstream 12 of the pressure control device 22.

The pressure control device 22 further comprises a controllable seal 32 for releasing and closing the fluid flow path 6 in the housing and a pressure sensor element 34 accommodated in the housing 24 for movement between a first and a second position. The pressure sensor element controls in the first position the controllable seal 32 to release the fluid flow path 6 in the housing 24. Further, the pressure sensor controls in the second position the controllable seal 32 to close off the fluid flow path in the housing 24. The pressure sensor element 34 is on the one hand exposed to the pressure prevailing in the fluid flow path 6 downstream of the controllable seal, and is on the other hand exposed to a predetermined force which, in use, determines the predetermined pressure. In use, the pressure sensor element 34 moves in the direction of the first position when the pressure prevailing in the fluid flow path 6 downstream 10 of the controllable seal 32 drops below the predetermined pressure determined by the predetermined force and the pressure sensor element 34 moves in the direction of the second position when the pressure prevailing in the fluid flow path downstream of the controllable seal 32 rises above the predetermined pressure determined by the predetermined force.

In FIG. 1 the pressure sensor element 34 is in the first position. In this example, the pressure sensor element 34 comprises a plunger 36 accommodated in a chamber 38 formed in the pressure control device 22. In this example, the chamber 38 is of cylindrical design. The plunger is accommodated in the chamber 38 for movement in axial direction 40 between the first and the second position. The plunger is movable between the first and the second position in a direction parallel to a direction 39 (in this example a horizontal direction) from the inflow opening to the outflow opening.

The space 42 enclosed by the plunger 36 and the chamber 38 is filled with a gas for generating a predetermined force pressing the plunger 36 in a direction of the first position. In this example the predetermined gas pressure in the space 42 is higher than the atmospheric pressure. In the example, this direction is horizontally downward.

The pressure control device further comprises a bush-shaped part 44 in which a channel 46 is formed. The fluid flow path 6 extends through the relevant channel. An open bottom side 48 of the channel 46 communicates with the inflow opening 26. An open top side 50 of the channel 46 is in fluid connection with the outflow opening 28, in this example via two openings 52, each opening provided in a side wall 54 of the chamber 38. Both in the first and in the second position of the plunger 36, the openings 52 are on the left side of the plunger 36, i.e. the openings 52 are located outside the space 42 enclosed by the chamber 38 and the plunger 36.

In this example, the pressure control device comprises a sealing element, such as a rubber ring 56, included in the channel 46. The rubber ring is attached to the housing, in this example to an inner wall of the channel 46. The controllable seal comprises a bar-shaped element 58 connected, outside the space 42 enclosed by the plunger 36 and the chamber 38, with the plunger 36. In this example, the bar-shaped element 58 extends through the rubber ring 56 and has its bottom side provided with a knob 60. In the first position, the knob 60 and the sealing ring 56 are separated from each other to release the fluid flow path 6. When, the plunger 36 moves to the right, the plunger 36 will move from the first position to the second position. As a result, the knob 60 will likewise move to the right and will, when the plunger 36 reaches its second position, abut against the bottom side of the rubber ring 56 to close off the fluid flow path 6. Hence, the plunger 36 is in the second position when the knob 60 has moved to the right and abuts against the rubber ring 56.

It also follows that the plunger 36 is movable between the first and the second position in a direction 39 parallel to the fluid flow path at the controllable seal 32,60. It also follows that the controllable seal 32, 60 is movable in a direction 39 parallel to the fluid flow path at the controllable seal. This has the advantage that forces acting from fluid flow at the seal and/or plunger will not cause friction between the plunger and/or controllable seal on the one hand and the housing on the other hand during movement of the plunger and/or controllable seal. It also follows that the bar-shaped element 58 is movable between the first and second position in a direction 39 which is parallel to the direction of the fluid flow path 6 along the bar-shaped element 58. This has the same advantage as discussed above.

A sealing element such as a sealing ring 68 is provided between the plunger 36 and an inner wall 70 of the chamber 38. The sealing ring 68 is attached to the plunger 36 so that the sealing ring is movable relative the chamber. The sealing ring 68 may be a rubber sealing ring.

The bottom side 61 (left side) of the plunger 36 is exposed to the pressure prevailing in the fluid flow path downstream of the controllable seal 32, i.e., the pressure at the outflow opening 28. On the other hand, the top side 63 (right side) of the plunger 36 is exposed to the predetermined pressure present in the space 42. This predetermined pressure generates a predetermined force pressing the plunger 36 in a direction of the first position. Conversely, the pressure prevailing at the outflow opening 28 presses the plunger 36 in a direction of the second position. As a result, the pressure sensor element (the plunger 36) moves in the direction of the first position when the pressure prevailing in the fluid flow path downstream of the seal drops below the pressure predetermined by the predetermined force. Further, the pressure sensor element 36 (the plunger 36) moves in the direction of the second position when the pressure prevailing in the fluid flow path downstream of the seal 32 rises above the pressure predetermined by the predetermined force.

The above has as a result that the device operates as follows. In the pipeline upstream 12 of the pressure control device 22, there prevails a pressure higher than the predetermined pressure at which the liquid 4 is to be transported in the pipeline downstream 10 of the pressure control device 22. When end users 72 connected to the pipeline downstream 10 of the pressure control device 22 take off fluid the liquid 4 will flow with a relatively high pressure into the pressure control device 22 via the inflow opening 26. The liquid 4 will then flow to the outflow opening 28 via the liquid flow path 6 in the housing 24. Via the outflow opening 28, the liquid 4 flows to the pipeline 2 downstream 10 of the pressure control device 22 to the end users 72.

When the pressure of the liquid 4 at the outflow opening 28 rises above the predetermined, desired pressure, the pressure of the liquid at the bottom side 61 of the plunger 36 will likewise rise above the predetermined value. In this example, the predetermined constant pressure at which the liquid 4 is to flow through the pipeline 2 downstream 10 the pressure control device to the end users 72 is equal to the pressure prevailing in the space 42. As a result, the plunger 36 will be moved to the right. After all, the pressure in the space 42 is less than the pressure prevailing at the bottom side 61 of the plunger 36. The plunger then moves from the first position in the direction of the second position. In and/or adjacent the second position, the plunger 36 will control the seal 32, 60, such that it closes off the fluid flow path 6. During closing of the fluid flow path 6, the pressure of the liquid at the outflow opening 28 will drop. This pressure drop continues until the pressure at the outflow opening 28 is equal to the pressure prevailing in the space 42. When the pressure of the liquid 4 at the outflow opening 28 threatens to drop below the pressure prevailing in the space 42, the plunger 36 will tend to move again in the direction of the first position. Consequently, the seal 32 will be controlled in such a manner that it will be slightly opened. As the seal 32 is opened again, the pressure at the outflow opening 28 will rise again, until the seal 32 is closed again when the plunger 36 is moved right again due to the rising pressure. This process continues and leads to an equilibrium condition at which the pressure of the liquid 4 at the outflow opening 28 and consequently in the pipeline 2 downstream 10 of the pressure control device 22 assumes the predetermined value determined by the predetermined pressure in the chamber 42, exerting the predetermined force on a top side 63 of the plunger. The pressure of the fluid in the pipeline 2 downstream 10 of the pressure control device is independent from the fluid flow rate supplied to the end users and independent from variations in pressure of the fluid in the pipeline upstream 12 of the pressure control device.

The pressure control device is provided with mounting means for mounting the pressure control device to the pipeline. The mounting means comprise for example a bayonet fastener 73 at the inflow opening 26 together with a sealing ring 74. The mounting means also comprise for example a bayonet fastener 76 at the outflow opening 28 together with a sealing ring 78.

Figure 2:
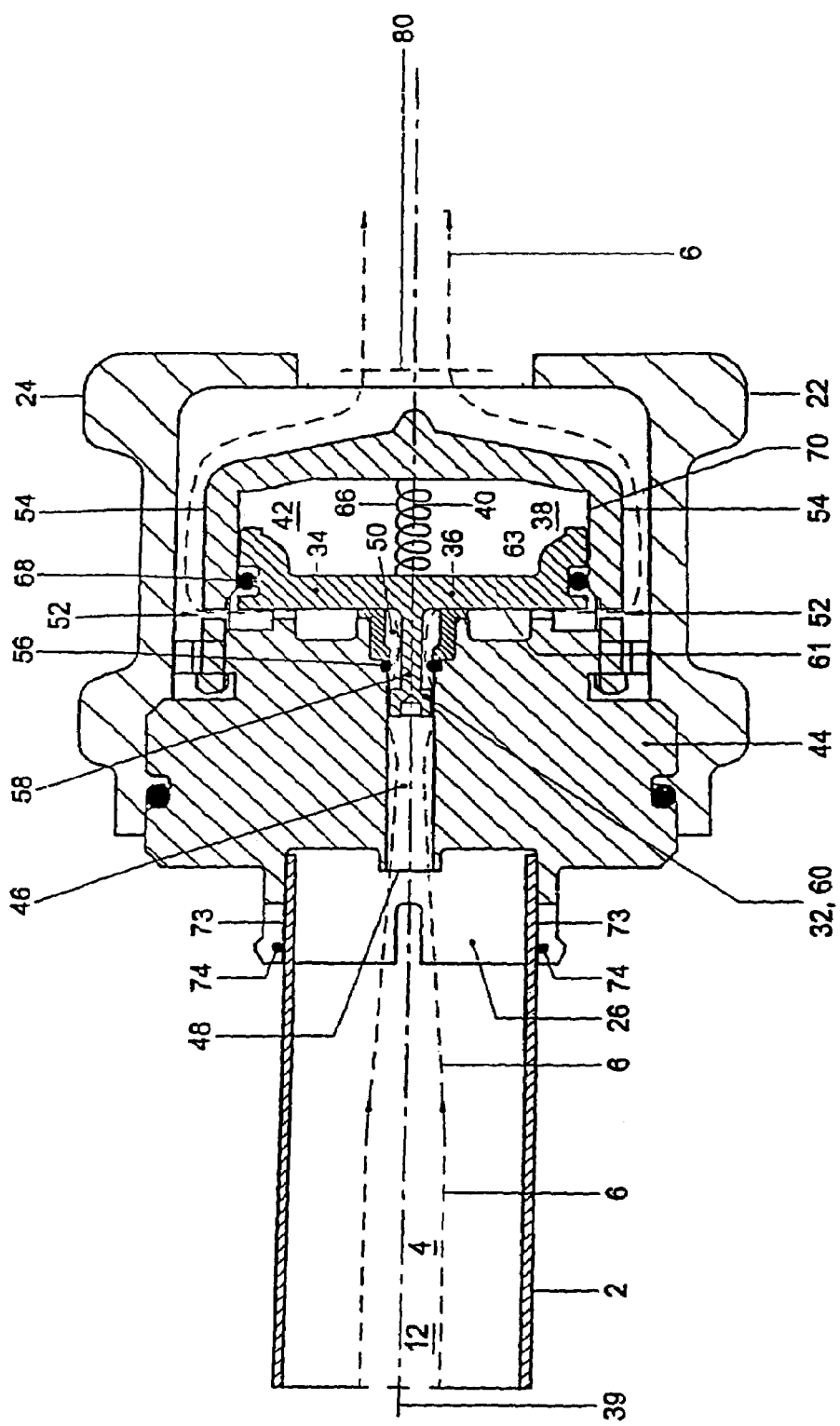
FIG. 2 shows a pressure control device of the invention configured at an end of a pipeline.

The invention is in no way limited to the embodiments outlined herein above. The flow rate may be high, such as between 1 liter/minute and 10000 liters/minute. The predetermined force on the pressure sensor element/plunger 34 may in addition be generated by means of a spring 66, as is shown in FIG. 1. The sealing element 56 may be attached to the bar shaped element and being movable in a recess of the inner wall of the channel 46 for releasing and closing the fluid flow path if the plunger moves between the first and second position. In the possible embodiment of FIG. 1 the outflow opening 28 is in fluid connection with the pipeline 2 downstream 10 of the pressure control device 22 so that the pipeline 2 also extends downstream the pressure control device. It is however also possible, as seen in FIG. 2, that the pressure control device forms the end of the pipeline 2. In FIG. 2 case the pipeline part downstream 10 of the pressure control device is deleted. In that case the outflow opening 28 may be provided with a valve 80 (schematically shown by dotted line 80). The pressure control device may in that case for example be located at the end user. The valve 80 is operated by the end user for starting and stopping of a flow of the liquid 4 through the valve. The valve can also be operated to regulate the flow rate through the valve 80. The flow rate may be high such as 10 liters/minute.

In this patent application, "a fluid" is also understood to mean a cream, paste, gel, powdery substance and possible combinations thereof. Such variants are each understood to fall within the framework of the invention.

What is claimed is:

1. A fluid transport assembly comprising, in combination:
   a pipeline for transporting a fluid along a fluid flow path extending in the pipeline; and
   a pressure control device incorporated in the pipeline for regulating the pressure of the fluid downstream of the pressure control device to a predetermined pressure, which is independent of, and less than, the pressure prevailing in the pipeline upstream of the pressure control device;
   wherein the pressure control device comprises:
   a housing with an inflow opening and an outflow opening, wherein the fluid flow path of the pipeline extends in the housing between the inflow opening and the outflow opening, the inflow opening being in fluid connection with the pipeline upstream of the pressure control device;
   a controllable seal for releasing and closing the fluid flow path in the housing;
   a pressure sensor element accommodated in the housing for movement between a first and a second position, the pressure sensor element in the first position controlling the controllable seal to release the fluid flow path in the housing and in the second position controlling the controllable seal to close off the fluid flow path in the housing, the pressure sensor element on the one hand being exposed to the pressure prevailing in the fluid flow path downstream of the controllable seal, and on the other being exposed to a predetermined force, which in use, determines the predetermined pressure, wherein, in use, the pressure sensor element moves in the direction of the first position when the pressure prevailing in the fluid flow path downstream of the seal drops below the predetermined pressure determined by the predetermined force and the pressure sensor element moves in the direction of the second position when the pressure prevailing in the fluid flow path downstream of the seal rises above the predetermined pressure determined by the predetermined force; and
   a gas-tight chamber, characterized in that, the pressure sensor element comprises a plunger accommodated in the chamber for movement in an axial direction of the chamber between the first and the second position, the space enclosed by the plunger and the chamber (a) being filled with a gas for generating a first portion said predetermined force and (b) comprising a resilient element for generating a second portion of said predetermined force, the resilient element being accommodated within the space enclosed by the plunger and chamber and being configured to urge the pressure sensor element toward the first position, the plunger being movable between the first and the second position in a direction parallel to the direction of the fluid flow path at the controllable seal and wherein the plunger is movable between the first and the second position in a direction from the inflow opening to the outflow opening, wherein the plunger moves in the direction of the first position if it moves in the direction of the inflow opening and the plunger moves in the direction of the second position if it moves in the direction of the outflow opening, the flow path extending around the gas-tight chamber between the inflow opening and the outflow opening.

2. An assembly according to claim 1, wherein the plunger is movable between the first position and second position in a direction which is parallel to an axial direction of the pipeline at the pressure control device.

3. An assembly according to claim 1, wherein the controllable seal is movable in a direction parallel to the fluid flow path at the controllable seal.

4. An assembly according to claim 1, wherein the gas-tight chamber is manufactured from metal.

5. An assembly according to claim 1, wherein the resilient element comprises a spring for generating at least a part of the second portion of said predetermined force, the spring being accommodated in the space enclosed by the plunger and the chamber and the spring pressing the plunger in the direction of the first position.

6. An assembly according to claim 1, wherein the pressure control device comprises at least one ring-shaped sealing element and the controllable seal comprises (a) controllable sealing element configured to abut the ring-shaped sealing element when the controllable sealing element is in the second position and (b) a connecting element connecting the controllable sealing element and the plunger, the sealing element extending around the connecting element, the fluid flow path extending through the ring-shaped sealing element, the connecting element and the ring-shaped sealing element in the first position releasing the fluid flow path, and the connecting element and the ring-shaped sealing element in the second position closing the fluid flow path.

7. An assembly according to claim 6, wherein the connecting element is movable between the first and second position in a direction which is parallel to the direction of the fluid flow path along the connecting element.

8. An assembly according to claim 1, wherein the gas pressure in the space is greater than an atmospheric pressure.

9. An assembly according to claim 1, wherein the pressure control device is provided with mounting means for mounting the pressure control device to the pipeline.

10. The pressure control device according to claim 9, wherein the mounting means comprises a bayonet fastener.

11. An assembly according to claim 1, wherein the outflow opening is in fluid connection with the pipeline downstream of the pressure control device so that the pipeline also extends downstream of the pressure control device.

12. An assembly according to claim 1, wherein the pressure control device forms the end of the pipe line.

13. A pressure control device configured to receive a fluid from an upstream portion of a fluid flow path and expel fluid towards a downstream portion of said fluid flow path, the pressure control device further configured to regulate a pressure in the downstream portion of the fluid flow path to match a predetermined pressure which is independent of, and less than, a pressure prevailing in the upstream portion of the fluid flow path, the pressure control device comprising:
- a housing having an inlet and an outlet, the inlet being in fluid communication with the upstream portion of the fluid flow path and the outlet being in fluid communication with the downstream portion of the fluid flow path;
- a controllable seal positioned in the housing and in communication with the inlet, the controllable seal configured to release and close the fluid flow path through the housing; and
- a pressure sensor element accommodated in the housing and configured to move between a first position in which the pressure sensor element causes the controllable seal to release the fluid flow path in the housing, and a second position in which the pressure sensor element causes the controllable seal to close off the fluid flow path in the housing, wherein
- the pressure sensor element is exposed to a pressure prevailing in the fluid flow path downstream of the controllable seal, and is also exposed to a predetermined force which determines the predetermined pressure;
- the pressure sensor element is configured to:
- move in direction of the first position when the pressure prevailing in the fluid flow path downstream of the controllable seal drops below the predetermined pressure determined by the predetermined force; and
- move in a direction of the second position when the pressure prevailing in the fluid flow path downstream of the seal rises above the predetermined pressure determined by the predetermined force;
- the pressure sensor element comprises a plunger that is accommodated in a gas-tight chamber, a space enclosed between the plunger and the chamber (a) being filled with a gas for generating a first portion of said predetermined force and (b) comprising a resilient element for generating a second portion of said predetermined force, the resilient element being accommodated within the space enclosed by the plunger and chamber and being configured to urge the pressure sensor element toward the first position;
- the plunger is arranged to move in an axial direction of the chamber between the first and the second position;
- the plunger is movable between the first and the second position in a direction parallel to the direction of the fluid flow path at the controllable seal; and
- the plunger is movable between the first and the second position in a direction from the inflow opening to the outflow opening, with the plunger moving in the direction of the first position when it moves in the direction of the inflow opening and the plunger moving in the direction of the second position when it moves in the direction of the outflow opening, the flow path extending around the gas-tight chamber between the inlet and the outlet.

14. The pressure control device according to claim 13, wherein the plunger is movable between the first and second position in a direction that is parallel to an axial direction of the pipeline at the pressure control device.

15. The pressure control device according to claim 13, wherein the controllable seal is movable in a direction parallel to the direction of the fluid flow path at the controllable seal.

16. The pressure control device according to claim 13, wherein the gas-tight chamber is manufactured from metal.

17. The pressure control device according to claim 13, wherein the resilient element comprises a spring for generating at least a part of the second portion of said predetermined force, the spring being accommodated in the space enclosed by the plunger and the chamber and the spring pressing the plunger in the direction of the first position.

18. The pressure control device according to claim 13, wherein the pressure control device comprises at least one ring-shaped sealing element and the controllable seal comprises (a) controllable sealing element configured to abut the ring-shaped sealing element when the controllable sealing element is in the second position and (b) a connecting element connecting the controllable sealing element and the plunger, the sealing element extending around the connecting element, the fluid flow path extending through the ring-shaped sealing element, the connecting element and the ring-shaped sealing element in the first position releasing the fluid flow path, and the connecting element and the ring-shaped sealing element in the second position closing the fluid flow path.

19. The pressure control device according to claim 18, wherein the connecting element is movable between the first and second position in a direction which is parallel to the direction of the fluid flow path along the connecting element.

20. The pressure control device according to claim 13, wherein the gas pressure in the space is greater than an atmospheric pressure.

21. The pressure control device according to claim 13, wherein the pressure control device is further provided with mounting means for mounting the pressure control device onto a pipeline.

22. The pressure control device according to claim 21, wherein the mounting means comprises a bayonet fastener.

23. A pressure control device arranged to be mounted to a pipeline which pipe line is arranged for transporting a fluid along a fluid flow path extending in the pipeline, wherein the pressure control device is arranged for regulating the pressure of the fluid downstream the pressure control device to a predetermined pressure which is independent of, and less than, the pressure prevailing in the pipeline upstream of the pressure control device, wherein the pressure control comprises a housing provided with an inflow opening and an outflow opening wherein, in use, the fluid flow path of the pipeline extends in the housing between the inflow opening and the outflow opening and the inflow opening being in fluid connection with the pipeline upstream of the pressure control device, the pressure control device further comprising a controllable seal for releasing and closing the fluid flow path in the housing and a pressure sensor element accommodated in the housing for movement between a first and a second position, the pressure sensor element in the first position controlling the controllable seal to release the fluid flow path in the housing and in the second position controlling the controllable seal to close off the fluid flow path in the housing, the pressure sensor element on the one hand being exposed to the pressure prevailing in the fluid flow path downstream of the controllable seal, and on the other being exposed to a predetermined force which, in use, determines the predetermined pressure, wherein, in use, the pressure sensor element moves in the direction of the first position when the pressure prevailing in the fluid flow path downstream of the seal drops below the predetermined pressure determined by the predetermined force and the pressure sensor element moves in the direction of the second position when the pressure prevailing in the fluid flow path downstream of the seal rises above the predetermined pressure determined by the predetermined force wherein the pressure control device comprises a gas-tight chamber, characterized in that, the pressure sensor element comprises a plunger accommodated in the chamber for movement in an axial direction of the chamber between the first and the second position, the space enclosed by the plunger and the chamber (a) being filled with a gas for generating a first portion of said predetermined force and (b) comprising a resilient element for generating a second portion of said predetermined force, the resilient element being accommodated within the space enclosed by the plunger and chamber and being configured to urge the pressure sensor element toward the first position, the plunger being movable between the first and the second position in a direction parallel to the direction of the fluid flow path at the controllable seal, wherein the plunger is movable between the first and the second position in a direction parallel to a direction from the inflow opening to the outflow opening, wherein the plunger moves in the direction of the first position if it moves in the direction of the inflow opening and the plunger moves in the direction of the second position if it moves in the direction of the outflow opening, the flow path extending around the gas-tight chamber between the inflow opening and the outflow opening.

24. A method for regulating a pressure of a fluid which is transported along a fluid flow path extending through a pipeline, the method comprising the step of:

incorporating into the pipeline, a pressure control device for regulating the pressure of the fluid downstream from the pressure control device to a predetermined pressure which is independent of, and less than, the pressure prevailing in the pipeline upstream of the pressure control device, wherein the pressure control device comprises a housing provided with an inflow opening and an outflow opening, wherein, in use, the fluid flow path of the pipeline extends in the housing between the inflow opening and the outflow opening wherein, in use, the inflow opening being in fluid connection with the pipeline upstream of the pressure control device;

the pressure control device further comprising a controllable seal for releasing and closing the fluid flow path in the housing and a pressure sensor element accommodated in the housing for movement between a first and a second position, the pressure sensor element in the first position controlling the controllable seal to release the fluid flow path in the housing and in the second position controlling the controllable seal to close off the fluid flow path in the housing, the pressure sensor element on the one hand being exposed to the pressure prevailing in the fluid flow path downstream of the controllable seal, and on the other being exposed to a predetermined force which, in use, determines the predetermined pressure, wherein, in use, the pressure sensor element moves in the direction of the first position when the pressure prevailing in the fluid flow path downstream of the controllable seal drops below the predetermined pressure determined by the predetermined force and the pressure sensor element moves in the direction of the second position when the pressure prevailing in the fluid flow path downstream of the seal rises above the predetermined pressure determined by the predetermined force wherein the pressure control device comprises a gas-tight chamber; and wherein, the pressure sensor element comprises a plunger accommodated in the chamber for movement in an axial direction of the chamber between the first and the second position, the space enclosed by the plunger and the chamber (a) being filed with a gas for generating said predetermined force and (b) comprising a resilient element for generating a second portion of said predetermined force, the resilient element being accommodated within the space enclosed by the plunger and chamber and being configured to urge the pressure sensor element toward the first position, the plunger being movable between the first and the second position in a direction which is parallel to the direction of the fluid flow path at the controllable seal, wherein, in use, the plunger is movable between the first and the second position in a direction which is parallel to a direction from the inflow opening to the outflow opening, wherein the plunger moves in the direction of the first position when it moves in the direction of the inflow opening and the plunger moves in the direction of the second position when it moves in the direction of the outflow opening, the flow path extending around the gas-tight chamber between the inflow opening and the outflow opening.

25. The method according to claim 24, wherein the plunger moves between the first and second position in a direction which is parallel to an axial direction of the pipeline at the pressure control device.

26. The method according to claim 24, wherein the controllable seal is movable in a direction parallel to the fluid flow path at the controllable seal.

27. The method according to claim 24, wherein the gas-tight chamber is manufactured from metal.

28. The method according to claim 24, wherein the resilient member comprises a spring for generating at least a part of the second portion of said predetermined force, the spring being accommodated in the space enclosed by the plunger and the chamber and the spring pressing the plunger in the direction of the first position.

29. The method according to claim 24, wherein the pressure control device comprises at least one ring-shaped sealing element and the controllable seal comprises (a) controllable sealing element configured to abut the ring-shaped sealing element when the controllable sealing element is in the second position and (b) a connecting connecting the controllable sealing element and the plunger, the sealing element extending around the connecting element, the fluid flow path extending through the ring-shaped sealing element, the connecting element and the ring-shaped sealing element in the first position releasing the fluid flow path, and the connecting element and the ring-shaped sealing element in the second position closing the fluid flow path.

30. The method according to claim 29, wherein the connecting element is movable between the first and second position in a direction which is parallel to the direction of the fluid flow path along the connecting element.

31. The method according to claim 24, wherein the gas pressure in the space is greater than an atmospheric pressure.

32. The method according to claim 24, wherein the pressure control device forms the end of the pipe line.

33. The method according to claim 24, wherein the pressure control device is used such that the outflow opening is in fluid connection with the pipeline downstream of the pressure control device so that, in use, the pipeline also extends downstream the pressure control device.

34. A pressure control device configured to provide passage of fluid between upstream and downstream portions of a fluid flow path, the pressure control device comprising:
   an inlet;
   an outlet;
   a pressure-regulating control device disposed along a fluid path extending between the inlet and the outlet, the pressure-regulating control device comprising:
   a sealed chamber comprising an enclosed fluid having a first pressure;
   a resilient element disposed within the sealed chamber;
   a valve disposed along the fluid path, the valve being movable between a first position obstructing passage of fluid along the fluid path from the inlet to the outlet and a second position allowing fluid to pass along the fluid path from the inlet to the outlet; and
   wherein a pressure of fluid present along the fluid path downstream of the valve urges the valve toward the first position and (a) the first pressure of the enclosed fluid present within the sealed chamber and (b) the resilient element each urge the valve toward the second position, the fluid path extending around the sealed chamber between the inlet and the outlet opening.

* * * * *